US009989256B2

(12) United States Patent
Sandelis et al.

(10) Patent No.: US 9,989,256 B2
(45) Date of Patent: Jun. 5, 2018

(54) INJECTION SYSTEM FOR A TURBINE ENGINE COMBUSTION CHAMBER CONFIGURED FOR DIRECT INJECTION OF TWO COAXIAL FUEL FLOWS

(71) Applicant: SNECMA, Paris (FR)

(72) Inventors: Denis Jean Maurice Sandelis, Nangis (FR); Romain Nicolas Lunel, Montereau sur le Jard (FR)

(73) Assignee: SNECMA, Paris (FR)

( * ) Notice: Subject to any disclaimer, the term of this patent is extended or adjusted under 35 U.S.C. 154(b) by 323 days.

(21) Appl. No.: 14/750,347

(22) Filed: Jun. 25, 2015

(65) Prior Publication Data

US 2015/0377489 A1 Dec. 31, 2015

(30) Foreign Application Priority Data

Jun. 25, 2014 (FR) ..................... 14 55906

(51) Int. Cl.
*F23R 3/14* (2006.01)
*F23R 3/36* (2006.01)
(Continued)

(52) U.S. Cl.
CPC .................. *F23R 3/14* (2013.01); *F02C 7/22* (2013.01); *F23C 7/004* (2013.01); *F23R 3/286* (2013.01);
(Continued)

(58) Field of Classification Search
CPC .... F23C 7/004; F23R 3/14; F23R 3/36; F23R 3/286
See application file for complete search history.

(56) References Cited

U.S. PATENT DOCUMENTS 5,197,290 A 3/1993 Lee et al.
6,035,645 A 3/2000 Bensaadi et al.
(Continued)

FOREIGN PATENT DOCUMENTS

EP 0 833 107 A1 4/1998
EP 1 253 379 A2 10/2002
(Continued)

OTHER PUBLICATIONS

French Preliminary Search Report dated Mar. 2, 2015 in French Application 14 55906, filed Jun. 25, 2014 (with English Translation of Categories of Cited Documents).

*Primary Examiner* — Pascal M Bui Pho
*Assistant Examiner* — Kyle Thomas
(74) *Attorney, Agent, or Firm* — Oblon, McClelland, Maier & Neustadt, L.L.P.

(57) ABSTRACT

An injection system for a turbine engine combustion chamber is provided. The injection system includes a first annular deflector surrounded by the bowl of the injection system and extending in the downstream direction from the downstream transverse surface that delimits the downstream side of the swirler. The first deflector has a free downstream end offset in the upstream direction from a downstream end of the bowl, so as to guide an air film output from the first orifices formed through the bowl. The internal radius of the cross section of the first annular deflector increases from the downstream transverse surface as far as the downstream end of the first annular deflector.

12 Claims, 7 Drawing Sheets

(51) Int. Cl.
  *F23R 3/28* (2006.01)
  *F23C 7/00* (2006.01)
  *F23R 3/34* (2006.01)
  *F02C 7/22* (2006.01)

(52) U.S. Cl.
  CPC ............... *F23R 3/343* (2013.01); *F23R 3/36* (2013.01); *F05D 2220/323* (2013.01); *F05D 2220/36* (2013.01); *F05D 2240/35* (2013.01); *Y02T 50/675* (2013.01)

(56) References Cited

U.S. PATENT DOCUMENTS

| | | | |
|---|---|---|---|
| 6,546,732 | B1 | 4/2003 | Young et al. |
| 2004/0065090 | A1 | 4/2004 | Al-Roub et al. |
| 2005/0011196 | A1 | 1/2005 | Leen et al. |
| 2005/0279862 | A1* | 12/2005 | Mao ................ F23D 11/107 239/403 |
| 2008/0168773 | A1* | 7/2008 | Sandelis ............... F23R 3/14 60/748 |
| 2008/0302105 | A1 | 12/2008 | Oda et al. |
| 2013/0327849 | A1* | 12/2013 | Matsuyama ........... F02M 23/12 239/406 |

FOREIGN PATENT DOCUMENTS

| | | |
|---|---|---|
| EP | 1 253 380 A2 | 10/2002 |
| EP | 1 408 280 A2 | 4/2004 |
| EP | 1 959 196 A2 | 8/2008 |

* cited by examiner

INJECTION SYSTEM FOR A TURBINE ENGINE COMBUSTION CHAMBER CONFIGURED FOR DIRECT INJECTION OF TWO COAXIAL FUEL FLOWS

TECHNICAL DOMAIN

This invention relates to the domain of turbine engine combustion chambers for aircraft and more particularly an injection system designed to be installed on a back wall of a combustion chamber for injection of an air and fuel mix into the combustion chamber.

STATE OF PRIOR ART

A turbine engine combustion chamber receives an air flow from a compressor on the upstream side and it supplies a combustion gas flow on the downstream side to drive the rotor of a turbine that in turn drives the compressor rotor.

Such a combustion chamber comprises two coaxial walls of revolution that extend one inside the other and that are connected at their upstream ends by an annular chamber back wall that comprises openings for the assembly of one or several annular rows of air and fuel injection systems.

The applicant's international application WO 98/13650 describes a typical example of a known type of injection system comprising a fuel injector with an injection head configured to inject a primary fuel flow output by a primary fuel circuit at all engine speeds, and a secondary fuel flow output by a secondary fuel circuit above a predetermined engine speed (this kind of injector being hereinafter called a "double flow" injector), a convergent-divergent profiled venturi separating an internal air flow output by a primary swirler and an external air flow output by a secondary swirler, and a bowl tapered outwards in the downstream direction and delimiting a downstream part of the injection system.

Primary and secondary fuel flows are generally in the form of cones centred on the same axis called the "injection axis" in the following, such that the secondary flow surrounds the primary flow.

In known types of injection systems, the angle of the cone formed by the primary fuel flow is limited such that this primary flow does not strike the venturi. On the other hand, the angle of the cone formed by the secondary fuel flow is relatively open to respect mix and uniformity requirements between consecutive injection systems. Consequently, the secondary fuel flow strikes the venturi, as described in the document according to prior art mentioned above.

Nevertheless, the fact that the secondary fuel flow strikes the venturi induces disadvantages, particularly due to the fact that fuel droplets can bounce on the venturi and induce a disturbance of the secondary fuel flow creating local turbulence in this fuel flow.

Moreover, such turbulence may induce the formation of a coke deposit on the venturi. Such a deposit may generate a hot wake at the outlet of the injection system and may in particular facilitate the emission of noxious gases such as nitrogen oxides (NOx).

PRESENTATION OF THE INVENTION

The purpose of the invention is particularly an injection system capable of avoiding some or all of these disadvantages.

To achieve this, it discloses an injection system for a turbine engine combustion chamber comprising:

a double flow injector with an injection head opening up into an internal space in the injection system, the injection head being configured to inject a primary fuel flow and a secondary fuel flow surrounding said primary fuel flow into the internal space, the primary and secondary fuel flows being conical and centred on a same injection axis;

a swirler comprising channels configured to generate an air flow swirling about said injection axis on the downstream side of said injection head to be mixed with the fuel output from the injection head, said swirler comprising a downstream transverse surface delimiting said channels at the downstream end and forming the upstream face of a downstream transverse wall of the swirler;

a bowl extending downstream from the downstream transverse wall of the swirler, and first orifices formed through the bowl for the formation of an air film along an inside surface of the bowl.

According to the invention, the injection system comprises a first annular deflector surrounded by the bowl, to guide said air film. This first annular deflector extends in the downstream direction from the downstream transverse surface of the swirler and it has a free downstream end offset in the upstream direction from a downstream end of the bowl. Furthermore, the internal radius of the cross section of the first annular deflector increases from the downstream transverse surface of the swirler as far as the downstream end of the first annular deflector. Finally, the first annular deflector delimits the outside of the internal space from the downstream transverse surface of the swirler as far as the downstream end of the first annular deflector. This last characteristic requires that the injection system does not have a convergent-divergent venturi.

The configuration of the injection system makes it possible to inject primary and secondary fuel flows into a combustion chamber directly without either of these flows striking any wall of the injection system, particularly because there is no venturi and due to the conformation of the first annular deflector.

Furthermore, the air film guided by the first annular deflector efficiently cools the bowl.

Preferably, the internal radius of the cross section of the bowl increases from the downstream transverse wall of the swirler as far as the downstream end of the bowl.

Preferably and in a manner known in itself, the primary and secondary fuel flows swirl in the same circumferential direction. Furthermore, the air flow output from the swirler swirls in the same direction as the primary and secondary fuel flows.

Preferably, the first orifices are oriented along a first circumferential direction such that said air film swirls about said injection axis in the same direction as the air flow originating from the swirler.

The air film output from the first orifices thus accelerates the secondary fuel flow and increases the opening angle of this flow due to the centrifugal effect.

Preferably, the injection system comprises second orifices formed through the bowl, downstream from said first orifices and oriented along a second circumferential direction contrary to said first circumferential direction.

Air output from the second orifices thus slows the secondary fuel flow and consequently reduces its opening angle.

Preferably, the channels in the swirler are distributed in a single annular row.

The injection system can thus be particularly compact. The lack of venturi makes the presence of a second annular row of channels in the swirler superfluous.

In a first preferred embodiment of the invention, the first orifices open up facing the first annular deflector.

Air injected through the first orifices is thus guided directly by the first annular deflector.

In a second preferred embodiment of the invention, the injection system comprises a second annular deflector with a downstream end connected to the bowl and a free upstream end. This second annular deflector extends facing the first orifices and is closer to the bowl than the first annular deflector.

The second annular deflector thus delimits a first passage extending between this second deflector and the bowl, this first passage being closed towards the downstream direction and open towards the upstream direction.

In this case, air injected through the first orifices is firstly guided towards the upstream direction in the first passage, along the bowl, by the second annular deflector, before being mixed with the secondary fuel flow.

Preferably, the upstream end of the second annular deflector extends between the downstream end of the first annular deflector and the bowl.

The upstream end of the second annular deflector thus delimits a second annular passage between itself and the downstream end of the first annular deflector.

Air output from the first passage is thus guided in the second passage, in the downstream direction, before being mixed with the secondary fuel flow.

The invention also relates to a combustion chamber for a turbine engine, comprising at least one injection system according to any one of the previous claims.

Finally, the invention relates to a turbine engine for an aircraft, such as a turbojet or a turboprop, comprising at least one combustion chamber of the type described above.

BRIEF DESCRIPTION OF THE DRAWINGS

The invention will be better understood, and other details, advantages and characteristics of it will become clear after reading the following description given as a non-limitative example with reference to the appended drawings in which.

In all these figures, identical references may denote identical or similar elements.

DETAILED PRESENTATION OF PREFERRED EMBODIMENTS

Figure 1:
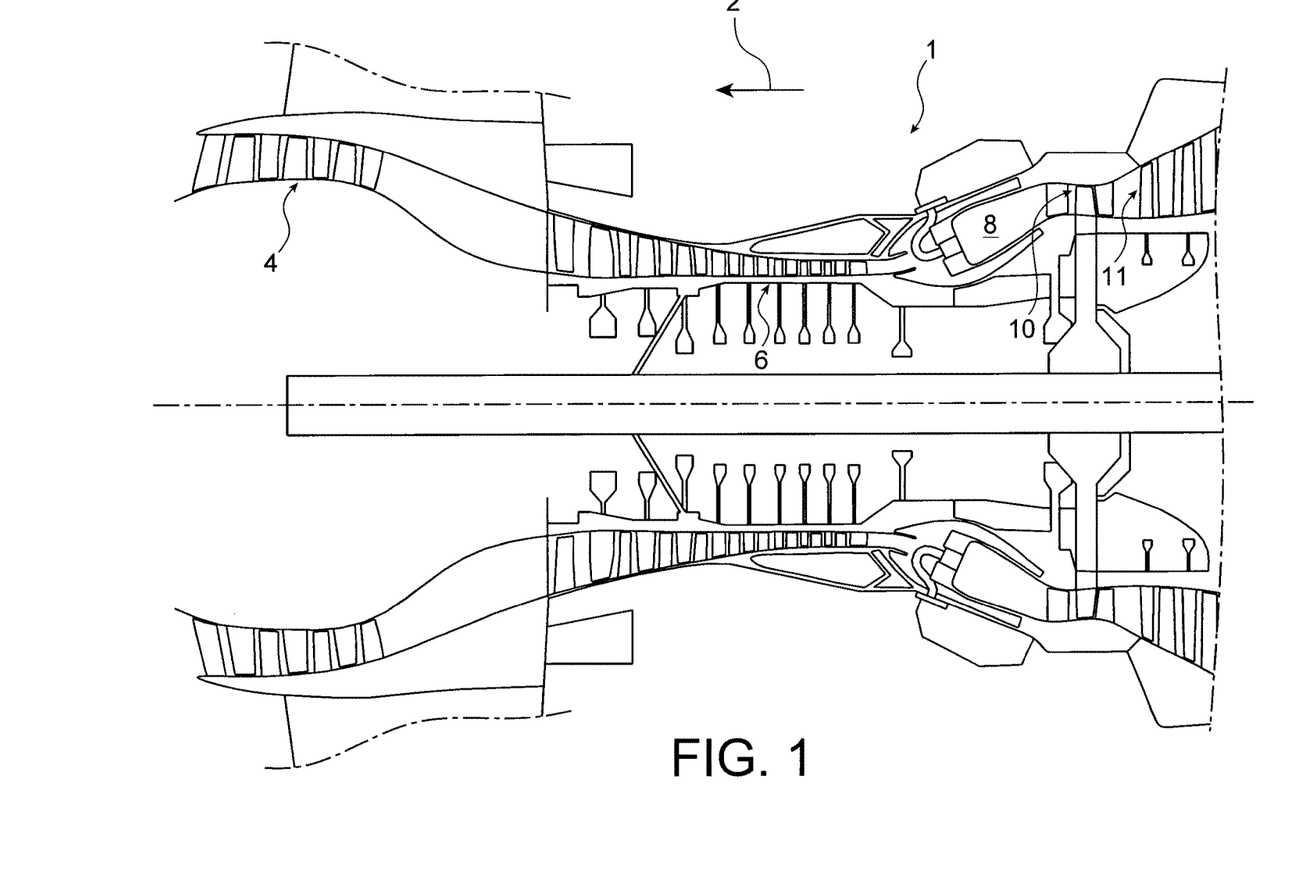
FIG. 1 is a diagrammatic partial axial sectional view of a turbine engine according to a first preferred embodiment of the invention.

FIG. 1 illustrates a turbine engine 1, for example a twin shaft turbofan according to a first preferred embodiment of the invention. This turbine engine includes a low pressure compressor 4, a high pressure compressor 6, an annular combustion chamber 8, a high pressure turbine 10 and a low pressure turbine 11, in sequence along the direction of the thrust shown by arrow 2 that is also the general gas flow direction.

In a well known manner, the combustion chamber 8 is installed downstream from the high pressure compressor 6 that will supply this chamber with air under pressure, and upstream from the high pressure turbine 10 that will drive the high pressure compressor 6 in rotation under the thrust of gases output from the combustion chamber.

Figure 2:
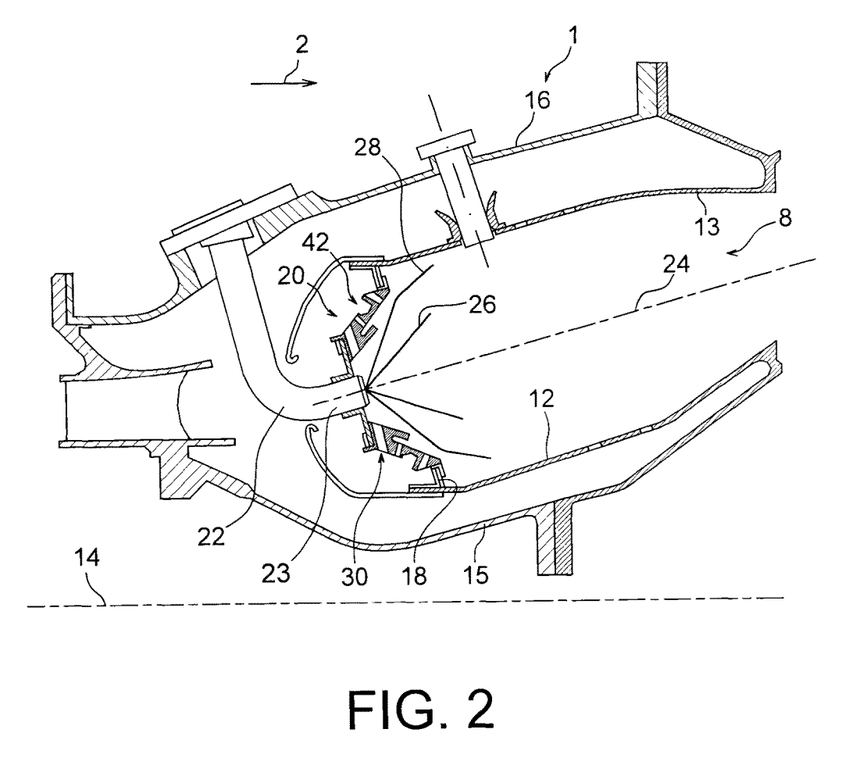
FIG. 2 is a diagrammatic partial axial sectional view of an annular combustion chamber of the turbine engine in FIG. 1.

FIG. 2 illustrates the combustion chamber 8 and its immediate environment at a larger scale.

The combustion chamber 8 comprises two coaxial annular walls, the radially internal wall 12 and the radially external wall 13, both annular walls extending about the longitudinal axis 14 of the combustion chamber.

These two annular walls 12 and 13 are fixed downstream from the internal casing 15 and the external casing 16 of the chamber and are connected to each other at their upstream end by an annular chamber back wall 18.

The annular chamber back wall 18 comprises an annular row of orifices uniformly distributed about the axis 14 of the combustion chamber, in which injection systems 20 are installed.

Each injection system 20 comprises an injector 22 with an injection head 23 aligned along an injection axis 24 and opening up into an internal space 25 in the injection system. The injection head 23 includes a primary circuit (not shown in the figure) to inject a primary fuel flow 26 into the internal space 25, at all operating speeds of the turbine engine, and a secondary circuit (not shown in the figure) to inject a secondary fuel flow 28 into the internal space 25, at operating speeds that exceed a predetermined threshold, for example starting from an operating speed called the «intermediate» speed. The injection head is configured such that the secondary flow 28 extends around the primary flow 26 and such that these two fuel flows 26 and 28 swirl in the same circumferential direction. It must thus be understood that in a manner known in itself, fuel is distributed by each of the primary and secondary circuits so as to swirl about the injection axis 24 in a predetermined circumferential direction.

Figure 3:
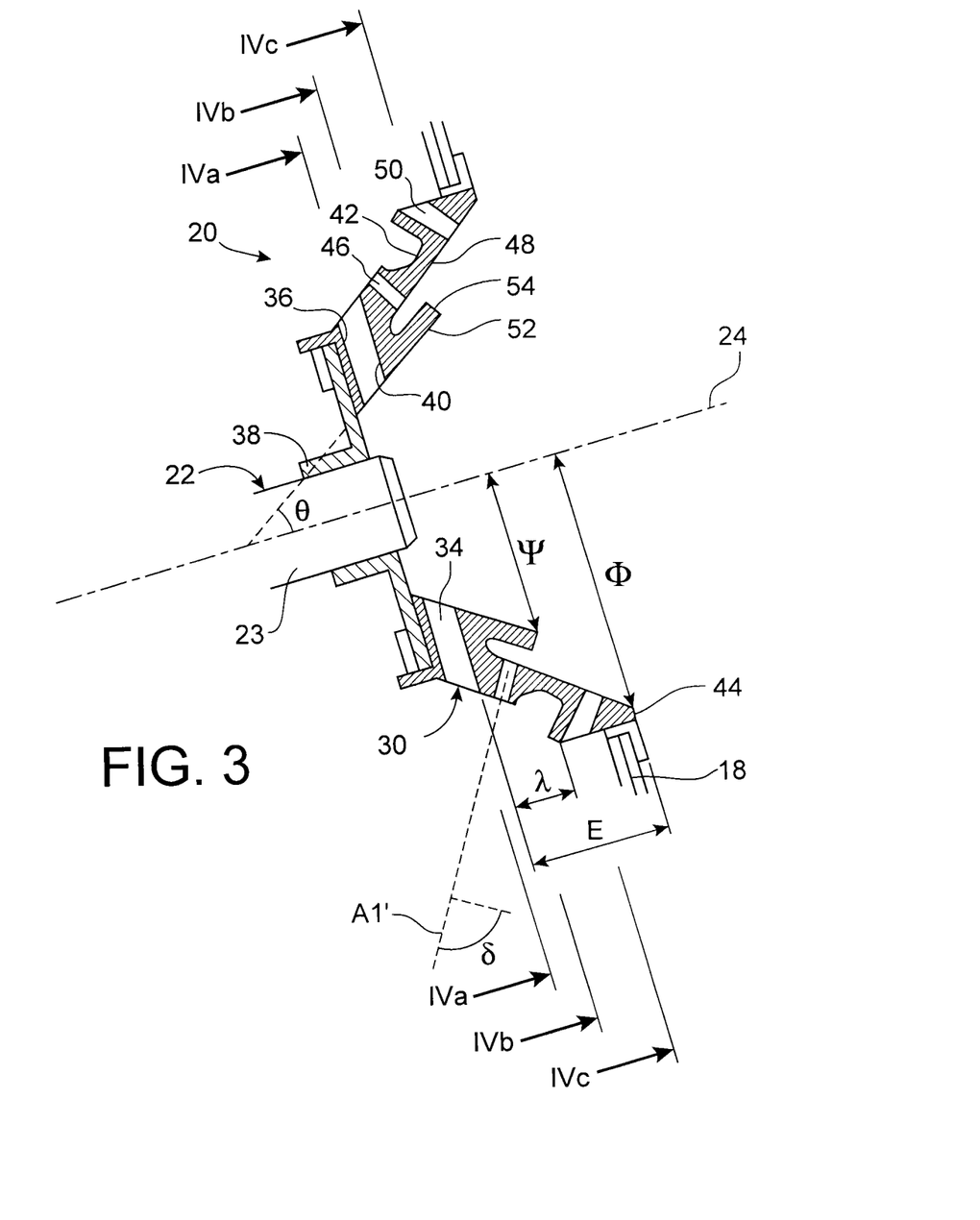
FIG. 3 is a diagrammatic view of detail III in FIG. 2 at larger scale, illustrating an injection system according to the first preferred embodiment of the invention.

As appears on FIG. 3 that shows an injection system 20 at a larger scale, this injection system also comprises a swirler 30 comprising channels configured to generate an air flow swirling about the injection axis 24, downstream from the injection head 23, such that the air flow mixes with the fuel flows 26 and 28 output from the injection head. To achieve this, the swirler 30 comprises swirl fins that delimit the channels.

Figure 4A:
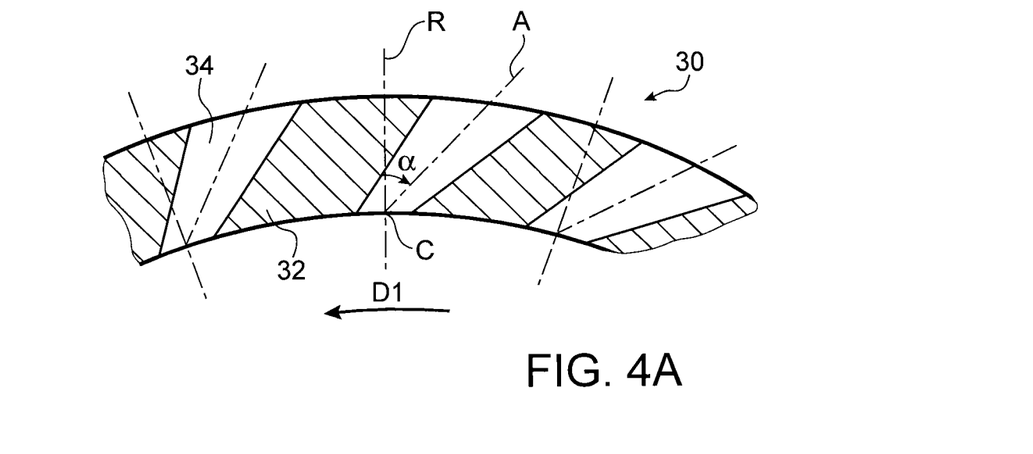
FIG. 4A is a partial diagrammatic sectional view of the injection system in FIG. 3, on plane IVa-IVa in FIG. 3.

In the example shown, the swirler 30 comprises a single annular row of fins 32 and channels 34 that can be seen in FIG. 4A. The swirler 30 is of the «radial type» in the sense that channels 34 extend orthogonal to the injection axis 24.

In the plane of FIG. 4A that extends orthogonal to the injection axis 24 and that corresponds to a view from the upstream direction, each channel 34 extends along an average direction A inclined from the radial direction R, defined relative to the injection axis 24 and taken at the centre C of the channel outlet section, at a positive angle α in the clockwise direction. This angle α is advantageously between 45 and 65 degrees. Channels 34 are thus oriented along a first circumferential direction D1 corresponding to the direction of the swirling air output from channels 34, namely in the anticlockwise direction in this example.

The swirler 30 comprises an upstream transverse surface 36 that delimits the channels 34 on the upstream side and forms the downstream face of an upstream transverse wall connected to a bushing 38 provided for centering the injection head 23 (FIG. 3). The swirler 30 also comprises a downstream transverse surface 40 that delimits the channels 34 on the downstream side and forms the upstream face of a downstream transverse wall of the swirler. The terms «transverse» surfaces and walls refer to surfaces and walls extending orthogonal to the injection axis 24. The fins 32 of the swirler 30 connect the upstream transverse surface 36 and the downstream transverse surface 40 together.

The injection system 20 also comprises a bowl 42 extending along the downstream direction from the downstream transverse wall 40 of the swirler. This bowl is tapered outwards in the downstream direction, in a manner known in itself.

In the example shown, the internal radius $\varphi$ of the cross section of the bowl 42 increases from the downstream transverse wall 40 of the swirler as far as the downstream end 44 of the bowl.

The bowl 42 comprises first orifices 46 that pass through the bowl to enable the formation of an air film along an inside surface 48 of the bowl.

Figure 4B:
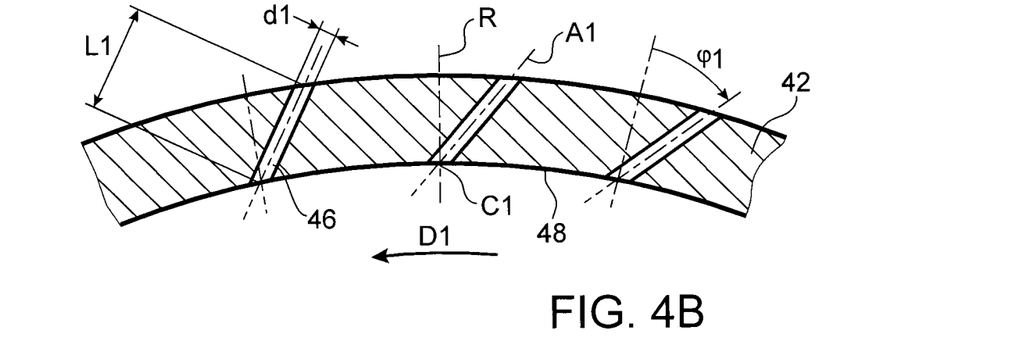
FIG. 4B is a partial diagrammatic sectional view of the injection system in FIG. 3, on plane IVb-IVb in FIG. 3.

As shown in FIG. 4B, the first orifices 46 are oriented in the first circumferential direction D1, such that the air film swirls about the injection axis 24 in the same direction as the air flow originating from the swirler 30. The air film thus co-swirls with the primary and secondary fuel flows 26 and 28. This air film will mix with the secondary fuel flow 28 so as to increase the opening angle of the secondary fuel flow by centrifuge effect downstream from the first orifices 46.

More precisely, in the plane of FIG. 4B that extends orthogonal to the injection axis 24 and that corresponds to a view from the upstream direction, each first orifice 46 extends along an axis A1 that is inclined relative to the radial direction R defined relative to the injection axis 24 and taken at the centre C1 of the outlet section from the first orifice, at an angle $\varphi 1$ that is positive in the clockwise direction. This angle $\varphi 1$ is advantageously between 45 and 65 degrees.

The length L1 of each first orifice 46 (FIG. 4B) is preferably more than 1.5 times the diameter d1 of the orifice to achieve optimum focusing of air at the outlet from each first orifice.

The bowl 42 also comprises second orifices 50 that pass through the bowl 42 on the downstream side of the first orifices 46 for injection of an air flow counter-rotating relative to the swirling air film output from the first orifices 46, into the injection system. The air flow output from the second orifices 50 is intended to mix with the secondary fuel flow 28 so as to reduce the rotation speed of this secondary fuel flow and thus reduce the opening angle of this secondary flow downstream from the second orifices 50.

Figure 4C:
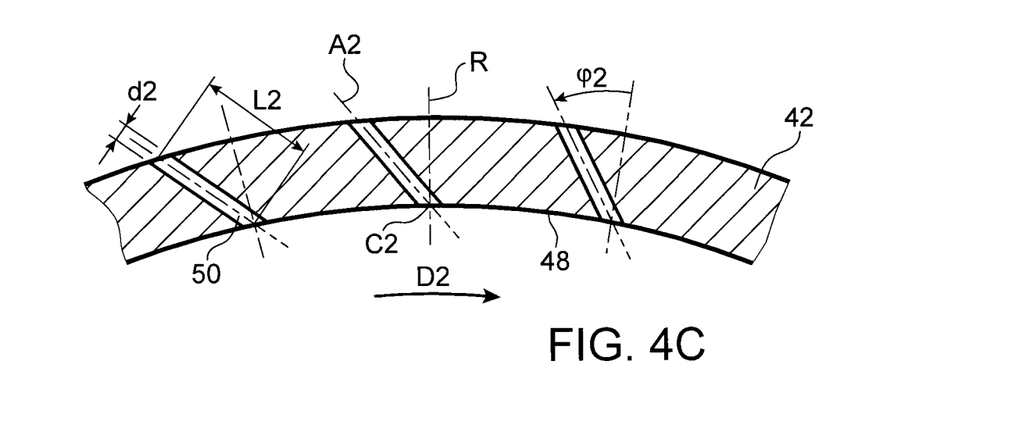
FIG. 4C is a partial diagrammatic sectional view of the injection system in FIG. 3, on plane IVc-IVc in FIG. 3.

To achieve this, the second orifices 50 are oriented along a second circumferential direction D2 opposite the first circumferential direction D1 as shown in FIG. 4C.

More precisely, in the plane of FIG. 4C that extends orthogonal to the injection axis 24 and that corresponds to a view from the upstream direction, each second orifice 50 extends along an axis A2 that is inclined relative to the radial direction R defined relative to the injection axis 24 and taken at the centre C of the outlet section from the second orifice, at an angle $\varphi 2$ that is positive in the anti-clockwise direction. This angle $\varphi 2$ is advantageously less than or equal to 45 degrees.

As a variant, the angle $\varphi 2$ may be approximately zero when it is required to slow the air film output from the first orifices 46 more moderately.

The length L2 of each second orifice 50 (FIG. 4C) is preferably more than 1.5 times the diameter d2 of the orifice to achieve optimum focusing of air at the outlet from each second orifice.

The injection system comprises a first annular deflector 52 that extends radially inside the bowl 42 (and that is therefore surrounded by it) and that extends in the downstream direction from the downstream transverse surface 40 of the swirler 30, so as to guide the swirling air film output from the first orifices 46. This first annular deflector 52 has a free downstream end 54, offset in the upstream direction from the downstream end 44 of the bowl. The distance $\lambda$ between the upstream end of the bowl 40 and the downstream end 54 of the first deflector 52 is for example equal to half the longitudinal extent E of the bowl 42.

Furthermore, the internal radius $\psi$ of the cross section of the first annular deflector 52 increases from the downstream transverse surface 40 of the swirler as far as the free downstream end 54 of this first annular deflector.

The first annular deflector 52 has a shape of revolution about the injection axis 24. In the example shown, the first annular deflector 52 is tapered in shape with a half-angle $\theta$ at the vertex within an interval varying from 30 degrees to 50 degrees (FIG. 3).

Furthermore, when each first orifice 46 is seen in a sectional view along an axial plane passing through the orifice, such as the plane of FIG. 3, the projection A1' of axis A1 of the first orifice in this axial plane is for example approximately orthogonal to the first annular deflector 52. More generally, in such an axial plane, the projection of the axis A1 is preferably inclined by an angle $\delta$ within an interval varying from 90 degrees to 120 degrees relative to the first annular deflector 52.

Similarly, when each second orifice 50 is seen in a sectional view along an axial plane passing through the orifice, such as the plane in FIG. 3, the projection of axis A2 of the second orifice in this axial plane is approximately orthogonal to the first annular deflector 52.

It should be noted that the injection system does not have any convergent-divergent venturi of the type used in injection systems according to prior art. The first annular deflector 52 delimits the outside of the internal space from the downstream transverse surface 40 of the swirler as far as the downstream end 54 of the first annular deflector. All parts delimiting the outside of the injection system downstream from the injection head 23, namely the swirler 30, the first annular deflector 52 and the bowl 42, extend outside a relatively open cone, such that the fuel flows 26 and 28 can penetrate directly into the combustion chamber, without striking any of the elements forming the injection system.

In the first preferred embodiment of the invention, the first orifices 46 open up facing the first annular deflector 52 (FIG. 3).

The first annular deflector 52 thus guides swirling air output from the first orifices 46 in the downstream direction and radially outwards along the inside surface 48 of the bowl.

Figure 5:
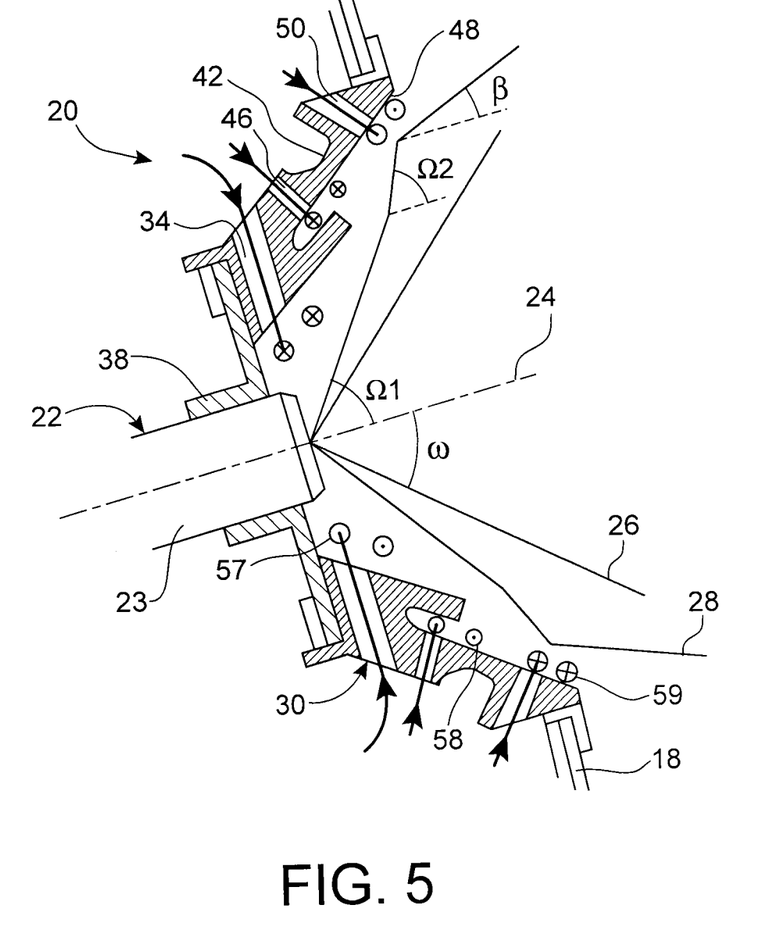
FIG. 5 is a view similar to FIG. 3 illustrating operation of the injection system according to the first embodiment.

During operation, as shown in FIG. 5, the primary fuel flow 26 is in the form of a cone for example forming a half-angle $\omega$ at the vertex equal to between about 35 and 45 degrees. The secondary flow 28 is tapered outwards starting from the injection head 23 and has the form of a cone, for example with a half-angle $\Omega 1$ at the vertex equal to between about 40 and 50 degrees.

The secondary flow 28 first mixes with the swirling air flow 57 output from channels 34 of the swirler 30.

The secondary fuel flow 28 (now mixed with air output from the swirler) arrives approximately axially at the downstream end 54 of the first annular deflector 52, and mixes with the swirling air film 58 output from the first orifices 46 and is diverted radially outwards under the effect of the centrifugal force induced by the air film 58. The secondary flow then opens up with a half-angle Ω2 at the vertex greater than Ω1.

Then, close to the second orifices 50, the secondary flow 28 mixes with counter-rotating air flow 59 output from these second orifices, that applies a shear force on the secondary flow 28. Therefore the divergence of the secondary flow is reduced and preferably has a half-angle at the vertex equal to between 10 and 35 degrees.

Figure 6:
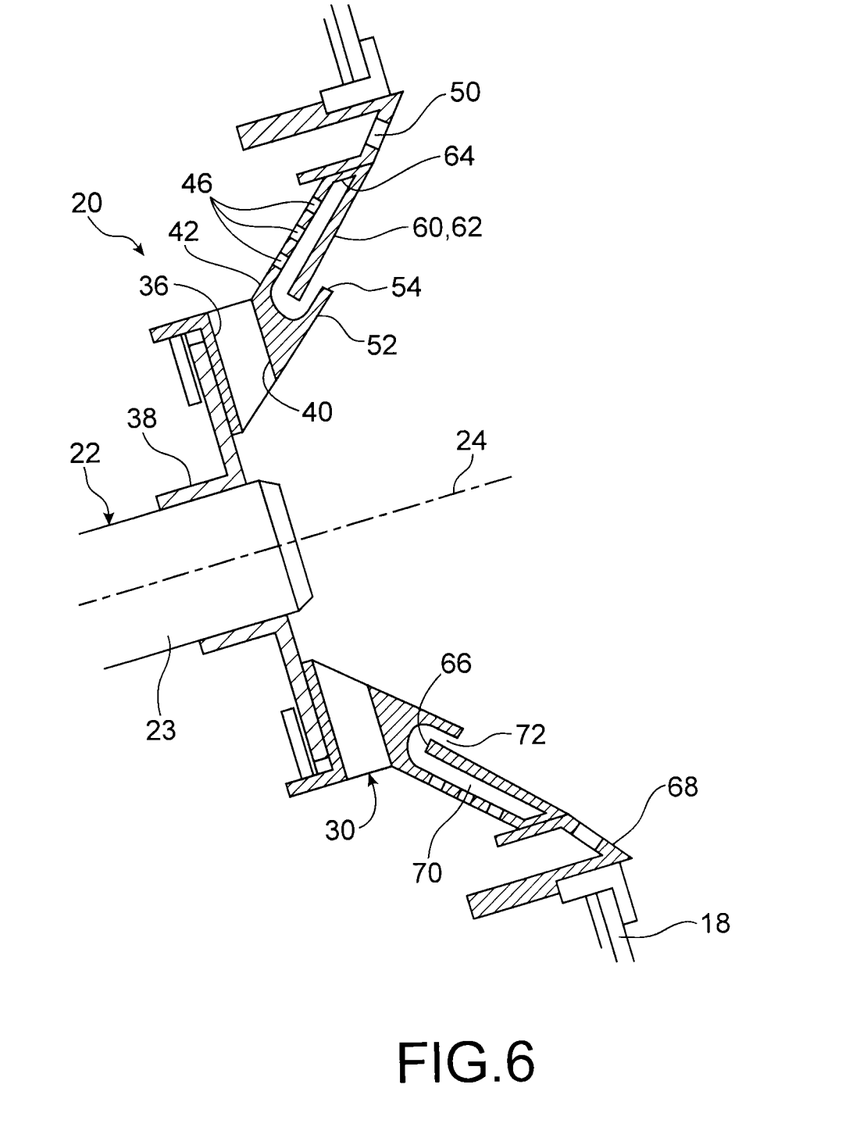
FIG. 6 is a view similar to FIG. 3 illustrating an injection system according to a second preferred embodiment of the invention.

FIG. 6 shows an injection system 20 according to a second preferred embodiment of the invention that will be installed in the annular back wall of a chamber 18 of an annular combustion chamber such as the chamber in FIG. 2.

This injection system is different from the injection system described above because the first orifices 46 do not open up facing the first annular deflector 52 and because this injection system also comprises a second annular deflector 60.

This second annular deflector 60 comprises a truncated cone-shaped wall 62 that extends radially inside the bowl 42, preferably parallel to this bowl as shown in FIG. 6. The second annular deflector 60 also comprises a truncated cone-shaped collar 64 at its downstream end, through which the truncated cone-shaped wall 62 is connected to the bowl 42, downstream from the first orifices 46. This truncated cone-shaped wall 62 extends facing the first orifices 46 and has a free upstream end 66.

The second annular deflector 60 is closer to the bowl than the first annular deflector 52. In particular, the free upstream end 66 of the second deflector extends between the downstream end 54 of the first deflector and the bowl 42.

The truncated cone-shaped wall 62 thus delimits a first annular passage 70 inside which this wall forces air output from the first orifices 46 to circulate in the upstream direction along the bowl 42 before going around the free upstream end 66 and then going on towards the downstream direction in a second annular passage 72 defined between an upstream end of the truncated cone-shaped wall 62 and the first annular deflector 52.

In the example shown, the first orifices 46 are distributed in three annular rows. Obviously, the number of row(s) of first orifices may be different without going outside the scope of the invention.

Furthermore, the bowl 42 extends in the downstream direction beyond the truncated cone-shaped collar 64 by means of a truncated cone-shaped ring 68 in which the second orifices 50 are formed.

Operation of the injection system according to the second embodiment described above is shown in FIG. 7 and is similar to operation of the injection system according to the first embodiment, except for the air film originating from the first orifices 46.

Figure 7:
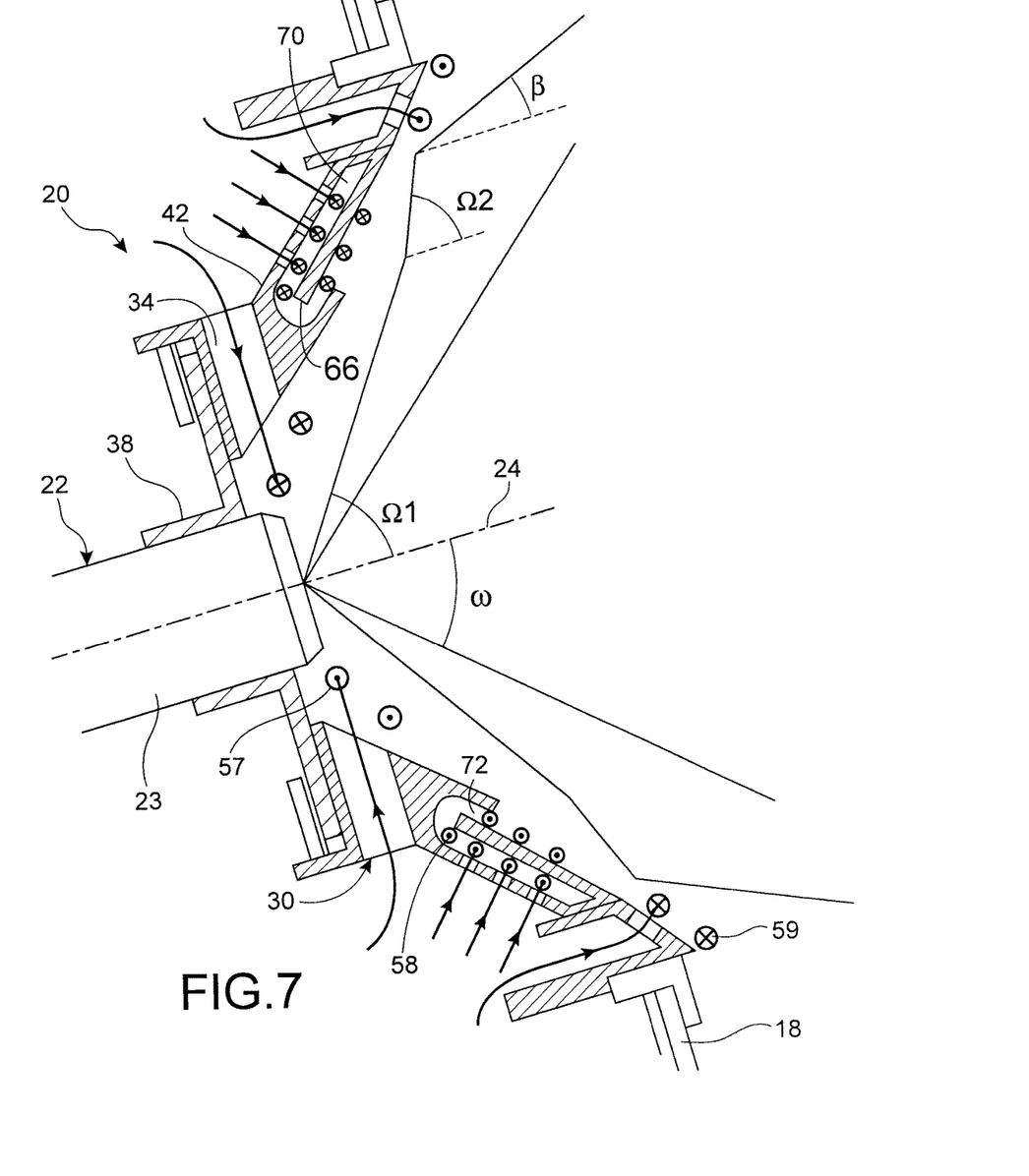
FIG. 7 is a view similar to FIG. 6 illustrating operation of the injection system according to the second embodiment.

This air film 58 circulates firstly in the upstream direction within the first annular passage 70 along the bowl 42 and then goes around the free upstream end 66 and continues in the downstream direction in the second annular passage 72 and exits from it mixing with the secondary fuel flow 28.

The invention claimed is:

1. An injection system for a turbine engine combustion chamber comprising:

a double flow injector with an injection head opening up into an internal space in the injection system, the injection head injecting a primary fuel flow and a secondary fuel flow surrounding said primary fuel flow into the internal space, the primary and secondary fuel flows being conical and centered on a same injection axis;

a swirler comprising channels configured to generate an air flow swirling about said injection axis on a downstream side of said injection head to be mixed with the primary and secondary fuel flows from the injection head, said swirler comprising a downstream transverse surface delimiting said channels at a downstream end and forming an upstream face of a downstream transverse wall of the swirler;

a bowl extending from the downstream transverse wall of the swirler towards a downstream direction;

first orifices formed through the bowl for the formation of an air film along an inside surface of the bowl; and a first annular deflector surrounded by the bowl and extending in the downstream direction from the downstream transverse surface of the swirler and having a free downstream end offset in the upstream direction from a downstream end of the bowl, to guide said air film, wherein an internal radius of a cross section of the first annular deflector continuously increases from the downstream transverse surface of the swirler as far as the downstream end of the first annular deflector, and wherein the first annular deflector delimits the outside of the internal space from the downstream transverse surface of the swirler as far as the downstream end of the first annular deflector.

2. The injection system according to claim 1, wherein an internal radius of a cross section of the bowl increases from the downstream transverse wall of the swirler as far as the downstream end of the bowl.

3. The injection system according to claim 1, wherein the first orifices are oriented in a first circumferential direction such that said air film swirls around said injection axis in the same direction as the air flow originating from the swirler.

4. The injection system according to claim 3, further comprising second orifices formed through the bowl downstream from said first orifices, and oriented along a second circumferential direction contrary to said first circumferential direction.

5. The injection system according to claim 1, wherein the channels in the swirler are distributed in a single annular row.

6. The injection system according to claim 1, wherein the first orifices open up facing the first annular deflector.

7. The injection system according to claim 1, further comprising a second annular deflector having a downstream end connected to the bowl and a free upstream end, the second annular deflector extending facing the first orifices and being closer to the bowl than the first annular deflector.

8. The injection system according to claim 7, wherein the upstream end of the second annular deflector extends between the downstream end of the first annular deflector and the bowl.

9. A combustion chamber for a turbine engine, including at least one injection system according to claim 1.

10. A turbine engine for an aircraft, including at least one combustion chamber according to claim 9.

11. The injection system according to claim 1, wherein each channel extends along an average direction inclined from a radial direction defined relative to the injection axis at positive angle in a clockwise direction.

12. The injection system according to claim 1, wherein the swirler, the bowl, and the first annular deflector are formed as a single monolithic piece.

\* \* \* \* \*

UNITED STATES PATENT AND TRADEMARK OFFICE
CERTIFICATE OF CORRECTION

PATENT NO. : 9,989,256 B2
APPLICATION NO. : 14/750347
DATED : June 5, 2018
INVENTOR(S) : Denis Jean Maurice Sandelis et al.

It is certified that error appears in the above-identified patent and that said Letters Patent is hereby corrected as shown below:

In the Specification

Column 4, Line 55, change "the <<radial type>> in the" to --the <<radial>> type in the--;

Column 7, Line 15, change "a half-angle at the" to --a half-angle $\beta$ at the--; and In the Claims Column 8, Line 64, Claim 10, change "aircraft, including" to --aircraft including--.

Signed and Sealed this
Eighteenth Day of June, 2019

Andrei Iancu
*Director of the United States Patent and Trademark Office*